DYNAMIC CONVERGENCE FOR PLURAL BEAM CATHODE-RAY TUBE

Filed Aug. 21, 1968 3 Sheets-Sheet 1

Inventor
Nicholas P. Pappadis
By Francis W. Crotty
Attorney

Inventor
Nicholas P. Pappadis
By Francis W. Crotty
Attorney

Inventor
Nicholas P. Pappadis
By Francis W. Crotty
Attorney 3,492,526
Patented Jan. 27, 1970

3,492,526

DYNAMIC CONVERGENCE FOR PLURAL BEAM CATHODE-RAY TUBE

Nicholas P. Pappadis, Chicago, Ill., assignor to Zenith Radio Corporation, a corporation of Delaware Filed Aug. 21, 1968, Ser. No. 754,434
Int. Cl. H01j *29/50*
U.S. Cl. 315—13 10 Claims

ABSTRACT OF THE DISCLOSURE

An image reproducing system, such as a color receiver, includes a cathode-ray tube having a cluster of three electron guns arranged in a delta pattern. When the beams impinge upon the central portion of the image screen, they pass through the deflection plane of the tube at three points which similarly define a delta or triangle. As the beams are deflected from this position in order to scan the entire image screen, they tend to become misconverged and convergence is maintained for all positions in the scanning raster by means of two dynamic convergence fields, spaced from one another along the beam paths and exerting deflection forces in opposite senses upon the individual beams. These fields are related to one another and to the scanning process so that at all deflection angles the three beams pass through the same points in the deflection plane and in this way the so-called color center triangle is maintained of constant size thus minimizing regrouping errors.

BACKGROUND OF INVENTION

The present invention is addressed to dynamic convergence for a multibeam image reproducing system and is particularly adapted for use in a color television receiver having a magnetically deflected three-gun cathode-ray tube. For convenience, the invention will be described in that environment.

A three-gun cathode-ray tube of the type under consideration usually has the array of guns defining a triangle or a delta and when the beams are directed to the center of the screen, they converge at the shadow mask or some such device included in such a tube for the purpose of color selection. It is well understood that as the beams are deflected from this central position, which of course is necessary to scan the entire screen, there is a tendency for the beams to misconverge and the extent of misconvergence increases with deflection angle. Obviously, it is necessary for optimum operation that the beams converge at the shadow mask at all positions in the scanning raster and this is usually accomplished by a convergence field established for each electron beam and through which each such beam passes just prior to entering the deflection field of the scanning yoke. The convergence system is energized by dynamic convergence signals derived from the horizontal and vertical scanning systems which facilitates properly correlating the effect of the convergence fields with deflection angle which is a necessary condition for maintaining the beams converged at all points in the scanning raster. All of this is well known in the art and is described, for example, in Patent 3,109,116, Epstein et al., issued Oct. 29, 1963.

As explained in that patent, while the convergence field may maintain the beams converged throughout the scanning raster, it introduces an undesired phenomenon known as a degrouping error. While the effect is explained in the reference patent, it may be summarized here by stating that the color center triangle in the plane of deflection varies in size, specifically it increases, with deflection angle. The color center triangle is an expression used in the art to describe the triangle defined by the three places where the three electron beams pass through the deflection plane which is usually in the central region of a scanning yoke. Since one may consider the apertures of the mask to function rather like a pinhole camera in imaging the color center triangle on the screen of the picture tube, it may be seen that the projected image increases in size as the color center triangle increases. Unless the phosphor triads screened on the faceplate of the tube are positioned in a related manner, the beam landings become disturbed with changes in size of the color center triangle. That is to say, as the color center triangle changes size, the beams tend to strike the phosphor dots of the color triads off center. It is this undesired disturbance or variation in the beam landings that results from the degrouping error. The Epstein patent attempts to minimize beam landing errors by the use of a compensated optical lens in screening the triads on the faceplate and it also proposes that degrouping errors be further compensated by a nonuniform spacing of the shadow mask with respect to screen, particularizing that this spacing have a maximum value at the center and decrease toward the edges of the raster. This approach has been used although it is difficult to practice because the beams of the tube are subjected to specifically different deflection fields; especially is this true of the blue beam, and further because yoke characteristics vary from one supplier to another which complicates matters still more. Also it is desirable not to have to vary the mask to screen spacing.

Accordingly, it is an object of the present invention to provide a novel dynamic convergence arrangement for a multibeam image reproducing system.

It is another specific object of the invention to provide an image reproducing system having an improved convergence system which obviates or materially minimizes degrouping errors even in systems featuring a delta or an in line array of three electrode guns.

It is still another specific object of the invention to provide a plural beam cathode-ray tube having a unique convergence arrangement.

Finally, it is a particular object of the invention to provide a three gun shadow mask cathode-ray tube having an improved dynamic convergence system which minimizes degrouping errors.

SUMMARY OF THE INVENTION

In accordance with the invention and for the purpose of minimizing degrouping errors, an image reproducing system comprises a plural beam cathode-ray tube having a reference plane of deflection, an image screen on one side of the reference plane and a plurality of electron guns arranged in a predetermined array on the other side of the reference plane for developing and directing toward the central portion of the screen a plurality of converged electron beams. As these beams pass through the reference plane in striking the central part of the screen, a condition for which no dynamic convergence is required, they define a pattern of beam centers corresponding to the array of electron guns. There is a deflection system for concurrently scanning the plurality of beams over the screen and finally there are dynamic convergence means for maintaining the beam pattern in the reference plane of constant configuration and constant size while maintaining the beams substantially converged as the deflection system scans the beams over the screen.

The invention is practiced with a plural beam cathode-ray tube having a plurality of electron guns supported in an array for developing and projecting a plurality of electron beams along individual beam paths. The tube also has a unique dynamic convergence arrangement. Specifically, convergence means establish at two regions spaced from one another along the beam paths a pair of convergence fields of opposed polarity. The relative intensity and lengths of these fields as well as their amplitude-time characteristic are related to the end that the color centers, which are the points where the beams penetrate the plane of deflection, remain substantially fixed for all deflection angles.

DESCRIPTION OF THE PREFERRED EMBODIMENT

Figures 1, 5, 6:
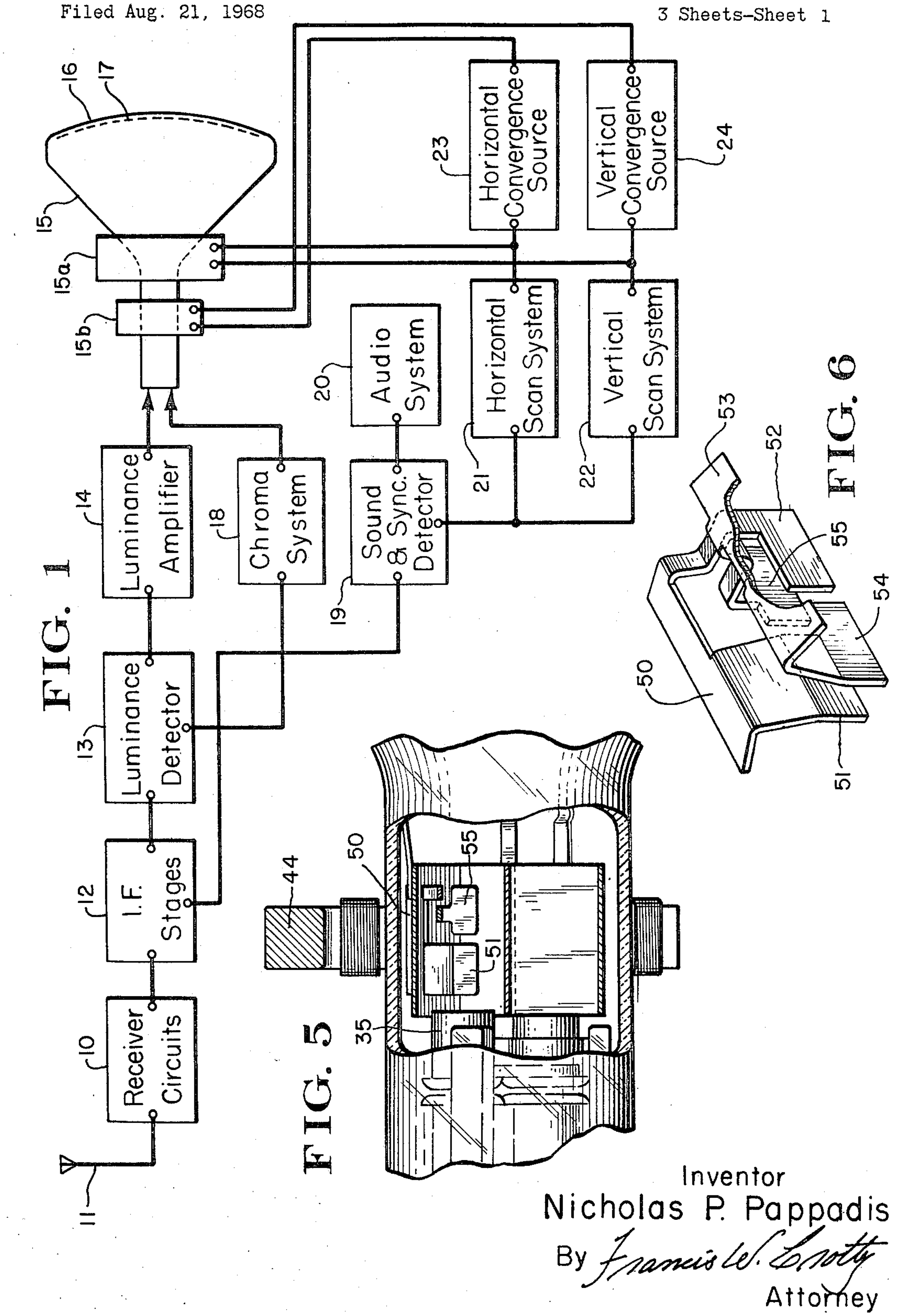
FIGURE 1 is a block diagram of a color television receiver to which the subject invention may be applied.
FIGURES 5 and 6 show a modified form of one portion of the tube of FIGURE 2.

The color receiver represented schematically in FIGURE 1 comprises receiver circuits 10 to which color broadcast signals are supplied from an antenna 11. It will be assumed that unit 10 includes all of the customary stages down to and including the first detector which delivers the desired program signal at an appropriate intermediate frequency to IF amplifier 12. The output of this amplifier is detected in a luminance detector 13 from which the luminance information is delivered through an amplifier 14 to the input of a color picture tube or image reproducing device 15. The tube is of the shadow mask variety having on its screen 16 a regularly repeating pattern of triads each of which comprises a dot of red, a dot of blue and a dot of green phosphor. Color selection by having three beams generated within the tube energize only the color phosphor dots assigned to each of them is achieved by the usual shadow mask 17. A second output of detector 13 is applied to a chroma system 18 which demodulates the chroma information so that there is applied to the input electrodes of the three guns of tube 15 both the luminance and the chroma information as required for the reproduction of images in simulated natural color.

A second output from IF amplifier 12 is applied to a sound and sync detector 19 in which the intercarrier sound component is derived for application to and utilization by an audio system 20. The synchronizing information developed in detector 19 is applied to both a horizontal and a vertical scanning system 21 and 22, respectively. Scanning signal outputs of these systems energize the usual deflection yoke **15*a* of the picture tube so that the three beams thereof are controlled to scan the screen in a repeating series of image fields of spaced horizontal lines. Element 15*b* of the picture tube is a schematic representation of the convergence system which is energized by dynamic convergence signals developed in a horizontal convergence source 23 and a vertical convergence source 24. Generally, the convergence signals are derived from the scanning systems so as to correlate the field to deflection angle and, therefore, sources 23 and 24 are shown coupled to scanning systems 21 and 22**.

As thus far described, the receiver is totally conventional both as to structure and mode of operation. Briefly, tuning of input circuits 10 permits a desired broadcast signal to be selected and, after being operated upon in the various stages of the receiver, it is applied as a luminance signal and as a chroma signal to picture tube 15 as the beams of that tube repetitively scan screen 16. The modulation of these beams with luminance and chrominance information and the color selection afforded by shadow mask 17 result in the receiver's responding to the incoming program signal to reproduce the translated image in simulated natural color. At the same time, the audio information is reproduced and the timing of the receiver is maintained in proper relation to the transmission by the scanning systems 21, 22. Additionally, dynamic convergence signals delivered to convergence system **15*b*** assure that the three beams remain properly converged at all points in the scanning raster.

Figures 7, 8:
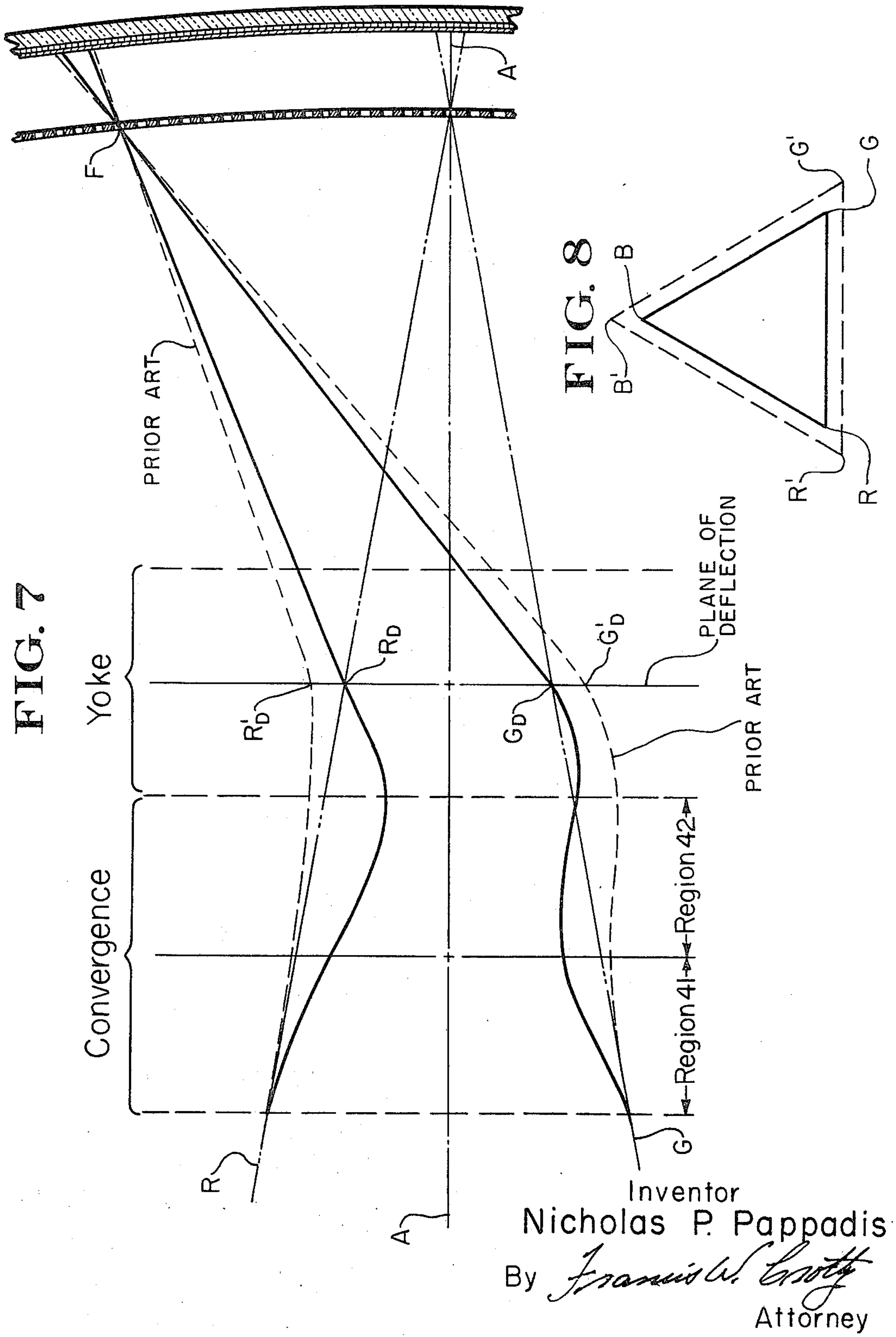
FIGURE 7 includes families of curves used in explaining the operation of the dynamic convergence system included in the arrangement of FIGURE 2.
FIGURE 8 shows a color center triangle of two different sizes.

Attention will now be given to the manner in which degrouping errors are obviated or minimized in such a receiver through practicing the present invention. At the outset, however, reference is made to the curves of FIGURE 7 which, by representing two positions of the red and green beams in the scanning raster, facilitate a more complete understanding of degrouping difficulties that have been experienced in the past. In this figure the dash-dot construction line A—A designates the center line of tube 15 and the points R and G may represent the red and green guns. If the influences of the yoke and convergence fields are neglected for the moment, the beams from the gun cluster of the tube (shown by the dash-dot-dot construction) are, perforce of their mechanical arrangement, converged at the center of shadow mask 17 and, since the apertures of the mask function analogously to a pin hole camera, there is projected on screen 16 an image of the electron beams. As stated, FIGURE 7 showns only the red and green beams and, therefore, is in effect two dimensional. This is simply for convenience of illustration and the image projected on screen 16 is in fact three dimensional, being an image of the color center triangle in the plane of deflection. This is represented by the full line triangle of FIGURE 8 which corresponds to the color triangle, per se, but is an enlargement of the image projected on screen 16. While the figures seem to correlate by inspection, it may aid to note that the points R and G of FIGURE 8 correspond to points $R_D$ and $G_D$, respectively, in FIGURE 7. The triangular representation results from the fact that the guns are arranged in a delta array and the corners of the triangle represent the points where the three electron beams penetrate the plane of deflection and define a triangular pattern of color centers directly related to the geometry of the gun cluster.

It may be shown that because of the geometry of the picture tube the converged condition of the beams at the center of the raster would not, in the absence of some correction, be maintained as the beams are deflected toward the edges of the raster. Conventionally, a dynamic convergence system is used to provide this correction and maintain convergence as the beams scan over screen 16. The broken-construction lines of FIGURE 7 are representative of prior dynamic convergence systems. They make clear that at a point F remote from the center of the screen the dynamic convergence system **15*b*** causes the beams to maintain their desired convergence but at the cost of an enlarged color center pattern. This is apparent from the fact that the beams shown in broken-construction line intercept the plane of deflection at points $R'_D$ and $G'_D$ which are farther removed from the center A—A of the tube than the intercepts $R_D$ and $G_D$ of the dash-dot representation of the conditions that exist with the beams at the center of the screen. In effect, the color center triangle has become enlarged as shown in broken construction in FIGURE 8. It is this undesired increase in size of the color center triangle in the plane of deflection that manifests itself in degrouping errors on the screen and it is this problem that the subject invention corrects.

The condition represented by the broken-line curves of FIGURE 7 is experienced in a conventional dynamic convergence system of the prior art in which each of the electron beams is subjected to its own single convergence field derived in response to one signal component related to the horizontal scanning frequency and another related to the vertical scanning frequency. The joint effect of these energizing signal components is a single convergence field of such intensity and amplitude-time variation as to achieve the desired convergence and to maintain it with change in deflection angle. In contradistinction, the dynamic convergence means of the present invention comprises means for establishing in two regions, spaced from one another along the path of each of the beams and between the electron guns and the plane of deflection, a pair of convergence fields which deflect each beam in opposite senses in response to dynamic convergence signals. A tube structure for responding to such signals to establish a pair of convergence fields for each beam while permitting flexibility in controlling their intensity and amplitude-time characteristic is represented in FIGURES 2—4.

Figures 2, 3, 4:
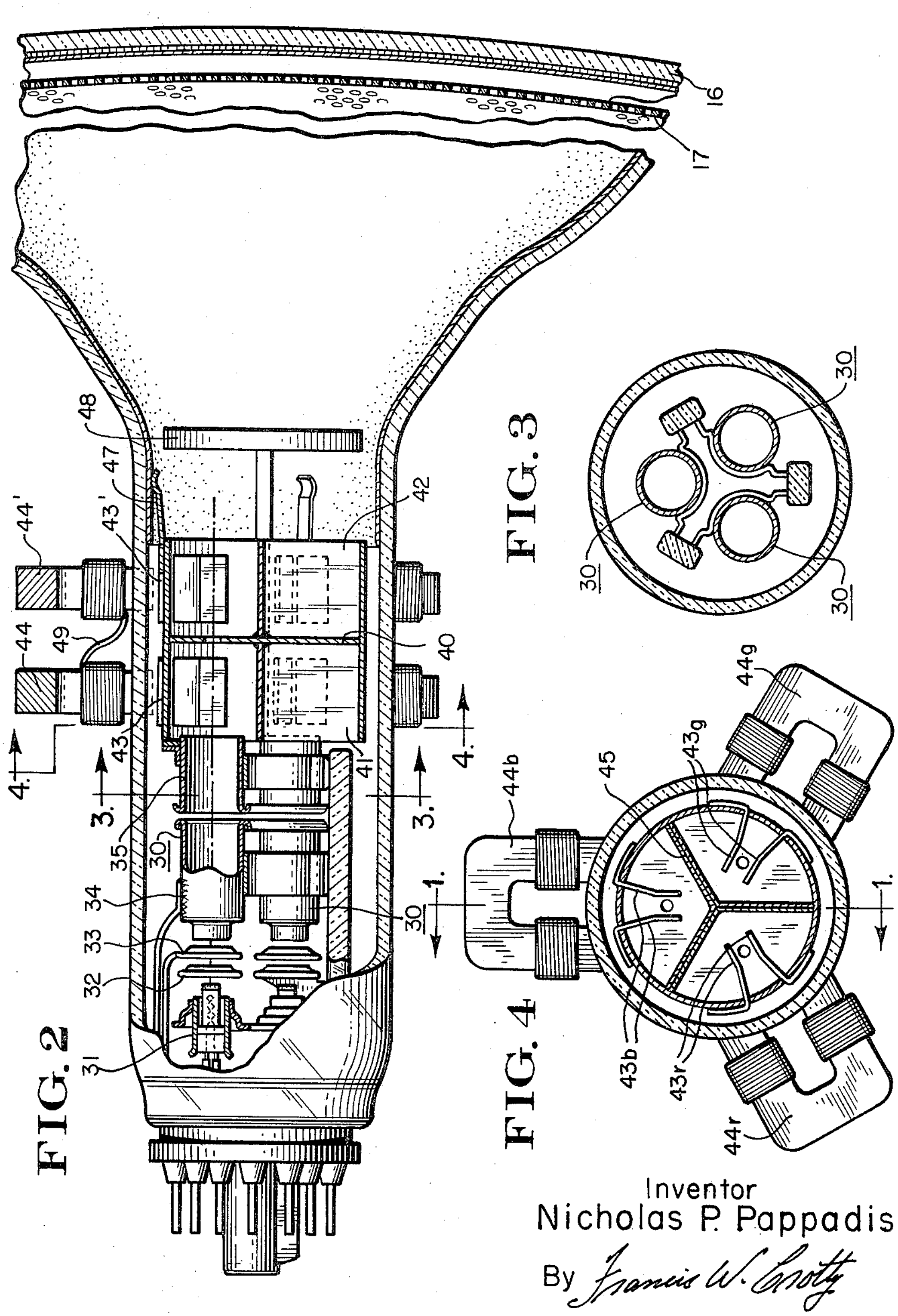
FIGURE 2 represents, partially in cross section, a cathode-ray tube featuring the inventive concept.
FIGURES 3 and 4 are views taken along section lines 3—3 and 4—4 of FIGURE 2.

In this structure, the gun cluster includes three electron guns 30 which are structurally the same and, as indicated in FIGURE 3, are arranged in a delta array. Each gun has the usual cathode assembly 31 followed by a first grid 32 that is used to intensity modulate the beam and second, third and fourth grids 33, 34 and 35 respectively, which focus and accelerate the electron beam, directing it along an assigned beam path toward shadow mask 17 and screen 16. Following the final electrode 35, there is a convergence cylinder which may be partitioned by a transverse shield 40 so as to comprise two convergence regions 41 and 42. Obviously, shield member 40 has suitable apertures concentric with the three beam paths as required to permit the beams to pass through both field regions 41, 42. Aside from the fact that the convergence cylinder is partitioned in the described manner and has duplicate field structures, it is very similar to that convertionally employed in the prior art and illustrated in detail of FIGURE 4.

There are three pairs of convergence pole pieces in each of regions 41 and 42, individually assigned to one of the three beams as indicated by the letters *r*, *g* and *b* associated with reference characters 43. Each such pair is disposed on opposite sides of the path of its assigned beam. Similarly, there are electromagnets **44*r*, 44*g* and 44*b* associated with each pair of pole pieces and having coils or windings to which dynamic convergence signals are applied for the purpose of energizing each magnet and establishing in the space between its pair of pole pieces a desired convergence field. Usually, the electromagnets have individual horizontal and vertical windings to which the corresponding convergence signals are applied. The several fields may be isolated from one another by a Y-shaped shield 45**.

As stated, this structure is provided for each of field regions 41 and 42. For convenience of differentiating between them, the field structure of region 41 is designated 43, 44 whereas the corresponding structure of region 42 is designated 43' and 44', omitting the letter designation in FIGURE 2 simply for the purpose of convenience.

Following the convergence system, the gun cluster has the usual snubber springs 47 which connect with the conductive coating deposited on the inner surface of the conical surface of the tube envelope and serving to extend the high voltage circuit to the final anodes 35 of each of the three guns. The convergence system may also support the getter structure 48.

The coils of the electromagnets 44 and 44' are energized by signals derived from convergence sources 23 and 24 of FIGURE 1. No claim of novelty is predicated on the circuitry of those sources and they have not been shown in detail. They are well known in the art and, if desired, each of these sources may, in effect, have two generators, generating two sets of horizontal convergence signals and two sets of vertical convergence signals.

More specifically, in the most general case there are developed two horizontal signals for application to the horizontal windings of electromagnets **44*r* and 44*r'*, respectively, and preferably they are independently adjustable as to intensity and waveform. Similar pairs of horizontal signals, independently adjustable, are developed for the horizontal windings of electromagnets 44*g* and 44*g'*, respectively, as well as for the horizontal windings of electromagnets 44*b* and 44*b'*, respectively. In like fashion, pairs of dynamic convergence signals derived from the vertical system and independently adjustable as to amplitude and waveform are developed for application to the various vertical windings of electromagnets 44*r*, 44*r'* and 44*g*, 44*g'* and 44*b*, 44*b'*. If signal sources 23 and 24 have two sets of signal generators allowing adjustment as to intensity and waveform of the various signal components applied to individually assigned one of the convergence windings, there is maximum flexibility in determining the characteristics of the convergence fields established in deflection regions 41 and 42** as a consequence of energizing the various electromagnets.

Let it be assumed initially that this approach has been adopted. It is necessary that the convergence fields established in region 41 be opposite in polarity to the corresponding fields established in region 42. As a consequence, each beam is deflected in region 41 in one sense with respect to the center line of the picture tube and is then deflected in the opposite sense as shown, for example, in the full-line curves of FIGURE 7. The beams are initially deflected toward the center line A—A and then are deflected away from the center line. By properly determining the parameters, the three beams enter the deflection yoke field at substantially the same angle as established with prior art convergence systems but, in contradistinction with such prior art arrangements, they pass through the plane of deflection at substantially the same points traversed by the beams during their converged condition at the center of the screen. Of course FIGURE 7, being two dimensional, represents this condition for only the red and green beams. The degrees of freedom for satisfying this desired condition include the lengths of convergence regions 41 and 42, the intensities of the dynamic convergence fields established in those regions which are a function of the amplitudes of the individual energizing signals, the reluctance of the magnetic circuits, and finally, the amplitude-time characteristics or waveforms of the dynamic convergence signals through which the slope of the beams, as they pass through the plane of deflection, are readily controlled as desired to achieve convergence and to maintain convergence with change in deflection angle. In other words, the second dynamic convergence field in region 42 adds to the system a degree of freedom to the end that the beam or color center triangle is maintained constant in size with deflection angle and degrouping errors are avoided or minimized while still achieving convergence of the three beams over the raster. This permits the use of a uniform spacing of mask 17 to screen 16. The flexibility of the arrangement as described also makes it possible to control the convergence fields in regions 41 and 42 to compensate for adverse effects attributable to the yoke.

It may not be necessary to make available individual horizontal and vertical dynamic convergence signals for the coils of each of the convergence structures associated with field regions 41 and 42. The same set of convergence signals may be delivered to both magnetic structures associated with each electron beam in which case the coils of both structures may be connected in series as shown by connection 49 in FIGURE 2 although it is still essential that the current flow through the coils result in two convergence fields influencing each of the electron beams in opposite senses as explained in conjunction with the full-line curves of FIGURE 7. One of the convergence fields may be established closer to the cathodes of the guns by, for example, inserting pole pieces through slots provided in grid 3 but the arrangement shown is preferred because the beam velocities are more nearly equal in regions 41 and 42 and, therefore, like fields in these regions have much the same influence on the beams albeit they operate in opposite senses.

The modification of FIGURE 5 simplifies the convergence structure by permitting the use of a single set of electromagnets 44 which energize two sets of pole pieces that are structurally arranged to establish the opposite convergence fields. One form of the complex pole piece structure is shown in FIGURE 6 and comprises a magnetic member 50 which has a first pole piece 51 depending therefrom and situated on one side of the path of the electron beam that this structure is to influence. At its opposite end, member 50 supports a second pole piece 52 which is displaced in the direction of screen 16 from pole piece 51 and is further displaced tranversely relative to pole piece 51 so as to be on the opposite side of the same beam path. The companion pole pieces are supported from a common magnetic member 53 from which depends a pole piece 54 which is on the same side of the beam path as pole piece 52 but faces and is the companion of pole piece 51. Member 53, likewise, supports a second pole piece 55 on the same side of the beam path as pole piece 51 but facing and serving as the companion of pole piece 52. Using a structure of this type affords obvious simplification over the arrangement of FIGURE 2. Some control of the two deflection fields is possible by dimensioning of the pairs of pole pieces 51, 54 and 52, 55. While the pole pieces of any pair are matched, that is to say, have the same dimensions, their length, width and spacing relative to the second pair associated with a given electron beam may be adjusted to control the intensity and the effective length of the convergence fields where length is here referred to the dimension along the beam path. The adjustment provided in this fashion is, of course, necessary since this modification develops opposing convergence fields from a single set of dynamic convergence signals supplied to a single set of convergence electromagnets.

The described arrangement is effective in minimizing degrouping errors in three gun color tubes of various sizes featuring a gun cluster with the guns in a delta array. It is likewise useful for tube structures in which the three guns are co-linear and makes possible the use of a uniform spacing of mask tube screen.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. An image reproducing system comprising:

a plural beam cathode-ray tube having a reference plane of deflection, an image screen on one side of said reference plane and a plurality of election guns arranged in a predetermined array on the other side of said reference plane for developing and directing toward the central portion of said screen a plurality of converged electron beams which, in passing through said reference plane, define a pattern of beam centers corresponding to said array;

a deflection system for concurrently scanning said plurality of beams over said screen;

and dynamic convergence means for maintaining said beam pattern in said reference plane of substantially constant configuration and size and for maintaining said beams substantially converged as said deflection system scans said beams over said screen.

2. An image reproducing system in accordance with claim 1 in which said tube is a color tube having an interlaced pattern of a corresponding plurality of different phospor materials on said image screen;

and in which said tube further has a shadow-mask color selection electrode of substantially the same configuration as said screen and having a uniform spacing with respect to said screen.

3. An image reproducing system in accordance with claim 2 in which said tube has a delta array of three electron guns the beams from which define a triangular pattern in passing through said reference plane;

and in which said dynamic convergence means maintains said triangular pattern a substantially constant size.

4. An image reproducing system in accordance with claim 1 in which said dynamic convergence means comprises means for establishing in two regions, spaced from one another along the paths of said beams between said electron guns and said reference plane, a pair of convergence fields which deflect said beams in opposite senses in response to applied dynamic convergence signals.

5. An image reproducing system in accordance with claim 4 in which said convergence means establishes both of said pair of convergence fields in response to a common set of dynamic convergence signals.

6. A plural beam cathode-ray tube comprising:

a plurality of electron guns for developing and projecting a plurality of electron beams, along individual beam paths;

and dynamic convergence means for establishing at two regions spaced from one another along said beam paths a pair of convergence fields of opposed polarity.

7. A plural beam cathode-ray tube in accordance with claim 6 in which said dynamic convergence means comprises a pair of pole pieces for, and positioned on opposite sides of, each of said beams in each of said two regions;

and electromagetnic means, coupled to said pole pieces, for establishing said convergence fields between said pole pieces.

8. A plural beam cathode-ray tube in accordance with claim 7 in which a single electromagnetic is coupled to and energizes the pole pieces associated with an assigned one of said beams in both of said regions.

9. A plural beam cathode-ray tube in accordance with claim 8 in which the pole piece positioned on any side of any one of said beams in one of said regions is integrated into a unitary pole-piece structure with the pole piece positioned on the opposite side of the same beam in the other of said regions.

10. A plural beam cathode-ray tube in accordance with claim 7 in which the dimensions of the pair of pole pieces coupled to any one of said beams in one of said regions and the reluctance associated therewith are related to the dimensions of the pair of pole pieces coupled to the same beam in the other of said regions and the reluctance associated therewith to effect a predetermined relative intensity of the convergence fields acting on said one beam in said two regions.

References Cited

UNITED STATES PATENTS

| | | | |
|---|---|---|---|
| 2,460,609 | 2/1949 | Torsch | 313—77 |
| 2,863,091 | 12/1958 | Epstein et al. | 315—13 |
| 2,880,340 | 3/1959 | Armstrong | 315—13 |
| 3,409,791 | 11/1968 | Ashizaki et al. | 313—77 X |

RODNEY D. BENNETT, Jr., Primary Examiner

MALCOM F. HUBLER, Assistant Examiner

U.S. Cl. X.R.

313—77